(12) United States Patent
Jin et al.

(10) Patent No.: US 10,929,519 B2
(45) Date of Patent: *Feb. 23, 2021

(54) RELIABLE TIMESTAMP CREDENTIAL

(71) Applicant: Visa International Service Association, San Francisco, CA (US)

(72) Inventors: Jing Jin, San Jose, CA (US); Christian Aabye, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,265

(22) Filed: Nov. 21, 2019

(65) Prior Publication Data
US 2020/0092324 A1 Mar. 19, 2020

Related U.S. Application Data

(63) Continuation of application No. 16/173,652, filed on Oct. 29, 2018, now Pat. No. 10,511,627, which is a
(Continued)

(51) Int. Cl.
*H04L 29/06* (2006.01)
*G06F 21/33* (2013.01)
(Continued)

(52) U.S. Cl.
CPC ............ *G06F 21/335* (2013.01); *G06F 9/442* (2013.01); *G06F 9/4416* (2013.01); *G06F 21/00* (2013.01);
(Continued)

(58) Field of Classification Search
CPC ... H04L 63/08; H04L 63/108; H04L 63/1466; H04L 63/106; H04L 2563/121; H04W 12/06; H04W 12/08
See application file for complete search history.

(56) References Cited

U.S. PATENT DOCUMENTS

| 6,769,068 B1 | 7/2004 | Brozowski et al. |
| 7,559,080 B2 * | 7/2009 | Bhargavan ............ H04L 63/08 713/151 |

(Continued)

FOREIGN PATENT DOCUMENTS

| GB | 2505532 | 3/2014 |
| KR | 1020090047662 | 5/2009 |
| WO | 2016040191 | 3/2016 |

OTHER PUBLICATIONS

EP17803256.1 , "Extended European Search Report", dated Apr. 26, 2019, 6 pages.
(Continued)

*Primary Examiner* — Hosuk Song
(74) *Attorney, Agent, or Firm* — Kilpatrick Townsend & Stockton LLP

(57) ABSTRACT

A process for authenticating a communication device may include receiving an authentication request including an access credential having a timestamp generated by the communication device may be received by the server. A determination can be made as to whether the communication device had successfully executed a predetermined shutdown sequence by determining whether the access credential has reliable timestamp information. The communication device can be authenticated when the timestamp has a non-reset value indicating that the communication device had successfully executed the predetermined shutdown sequence, and that the access credential has not expired. Step-up authentication for the communication device can be requested when the access credential has unreliable timestamp information indicating that the communication device did not successfully execute the predetermined shutdown sequence.

20 Claims, 9 Drawing Sheets

Related U.S. Application Data continuation of application No. 15/914,920, filed on Mar. 7, 2018, now Pat. No. 10,158,667, which is a continuation of application No. 15/165,675, filed on May 26, 2016, now Pat. No. 9,948,673.

(51) Int. Cl.

| | | |
|---|---|---|
| *H04W 12/06* | (2021.01) | |
| *H04W 76/27* | (2018.01) | |
| *G06F 9/4401* | (2018.01) | |
| *H04L 12/26* | (2006.01) | |
| *H04W 12/08* | (2021.01) | |
| *G06F 21/00* | (2013.01) | |

(52) U.S. Cl.
CPC ............ *H04L 43/106* (2013.01); *H04L 63/08* (2013.01); *H04L 63/108* (2013.01); *H04L 63/1466* (2013.01); *H04W 12/0608* (2019.01); *H04W 12/08* (2013.01); *H04W 76/27* (2018.02); *G06F 2221/2137* (2013.01); *G06F 2221/2151* (2013.01); *H04L 2463/121* (2013.01)

(56) References Cited

U.S. PATENT DOCUMENTS

| | | | |
|---|---|---|---|
| 7,631,808 B2 | 12/2009 | Kundu et al. | |
| 7,644,300 B1 | 1/2010 | Rao | |
| 7,949,677 B2 | 5/2011 | Croft et al. | |
| 8,132,247 B2* | 3/2012 | Adhya | G06Q 20/027 726/11 |
| 8,341,270 B2 | 12/2012 | Mazzaferri et al. | |
| 8,452,963 B2 | 5/2013 | Singer | |
| 8,590,030 B1 | 11/2013 | Pei | |
| 8,621,587 B2* | 12/2013 | Halls | H04L 63/0815 726/7 |
| 8,756,651 B2 | 6/2014 | Baer et al. | |
| 8,949,596 B2 | 2/2015 | Yin et al. | |
| 9,027,099 B1 | 5/2015 | Saylor et al. | |
| 9,059,919 B1 | 6/2015 | Sobel | |
| 9,269,358 B1 | 2/2016 | Saylor et al. | |
| 9,419,799 B1 | 8/2016 | Chung | |
| 9,594,922 B1 | 3/2017 | McGuire et al. | |
| 9,948,673 B2 | 4/2018 | Jin et al. | |
| 10,158,667 B2 | 12/2018 | Jin et al. | |
| 10,511,627 B2* | 12/2019 | Jin | H04L 63/08 |
| 2003/0182241 A1 | 9/2003 | Everhart | |
| 2008/0168177 A1 | 7/2008 | Subramaniam | |
| 2010/0191970 A1 | 7/2010 | Singer | |
| 2012/0209749 A1 | 8/2012 | Hammad et al. | |
| 2014/0095887 A1 | 4/2014 | Nayshtut et al. | |
| 2015/0088674 A1 | 3/2015 | Flurscheim et al. | |
| 2015/0147974 A1 | 5/2015 | Tucker et al. | |
| 2015/0207886 A1 | 7/2015 | Callaghan et al. | |
| 2015/0269566 A1 | 9/2015 | Gaddam et al. | |
| 2016/0316365 A1 | 10/2016 | Buhler et al. | |
| 2017/0208060 A1 | 7/2017 | Hanifen et al. | |
| 2017/0346850 A1 | 11/2017 | Jin et al. | |

OTHER PUBLICATIONS

PCT/US2017/030844, "International Search Report and Written Opinion", dated Jul. 28, 2017, 9 pages.

\* cited by examiner

RELIABLE TIMESTAMP CREDENTIAL

CROSS-REFERENCES TO RELATED APPLICATIONS

This application is a continuation of U.S. patent application Ser. No. 16/173,652 filed on Oct. 29, 2018, which is a continuation of U.S. patent application Ser. No. 15/914,920, filed on Mar. 7, 2018, which is a continuation of U.S. patent application Ser. No. 15/165,675, filed on May 26, 2016, the entire contents of all of which are hereby incorporated by reference for all purposes.

BACKGROUND

A replay attack may refer to the unauthorized capture of a data communication from a sender, and retransmission of the captured data by an unauthorized party as if the retransmission originated from the original sender. In a computer network environment, a replay attack can be employed by an unauthorized party to gain access to restricted services by faking the identity of an authorized user. For example, an access credential that a user provides to an authorization entity to gain access to a service from a service provider can be captured by an unauthorized party. The unauthorized party in possession of the access credential can retransmit it to the authorization entity to obtain the service from the service provider.

Embodiments of the present invention address these and other problems, individually and collectively.

BRIEF SUMMARY

To reduce the likelihood that an access credential obtained via a replay attack can be reused by an unauthorized party, an access credential can be valid for only a limited time. The access credential may include a timestamp indicating when the access credential was generated. By examining the timestamp information, an authorization entity receiving the access credential can determine the staleness of the access credential and whether the access credential has expired or not. If an expired access credential is received, this may indicate the access credential has been compromised and an unauthorized party may be attempting to access a service using the expired access credential. As such, the authorization entity may deny access to the service. However, the effectiveness of such techniques to mitigate against replay attacks may depend on the reliability of the timestamp information in the access credential. Accordingly, some embodiments of the present invention are directed to techniques for providing reliable timestamp information for use in an access credential.

According to some embodiments, a process for authenticating a communication device may include receiving a request from a communication device to synchronize time with a server, and providing an authorization network time to the communication device. Subsequent to the communication device transitioning from an active state to an inactive state and then back to the active state, an authentication request including an access credential having a timestamp generated by the communication device may be received by the server. A determination can be made as to whether the communication device had successfully executed a predetermined shutdown sequence by determining whether the access credential has reliable timestamp information. The communication device can be authenticated when the timestamp has a non-reset value indicating that the communication device had successfully executed the predetermined shutdown sequence, and that the access credential has not expired. Step-up authentication for the communication device can be requested when the access credential has unreliable timestamp information indicating that the communication device did not successfully execute the predetermined shutdown sequence.

According to some embodiments, a server computer associated with an authentication network may include a processor and a memory storing computer readable code, which when executed by the processor, causes the server computer to perform the operations above.

DETAILED DESCRIPTION

Figure 1:
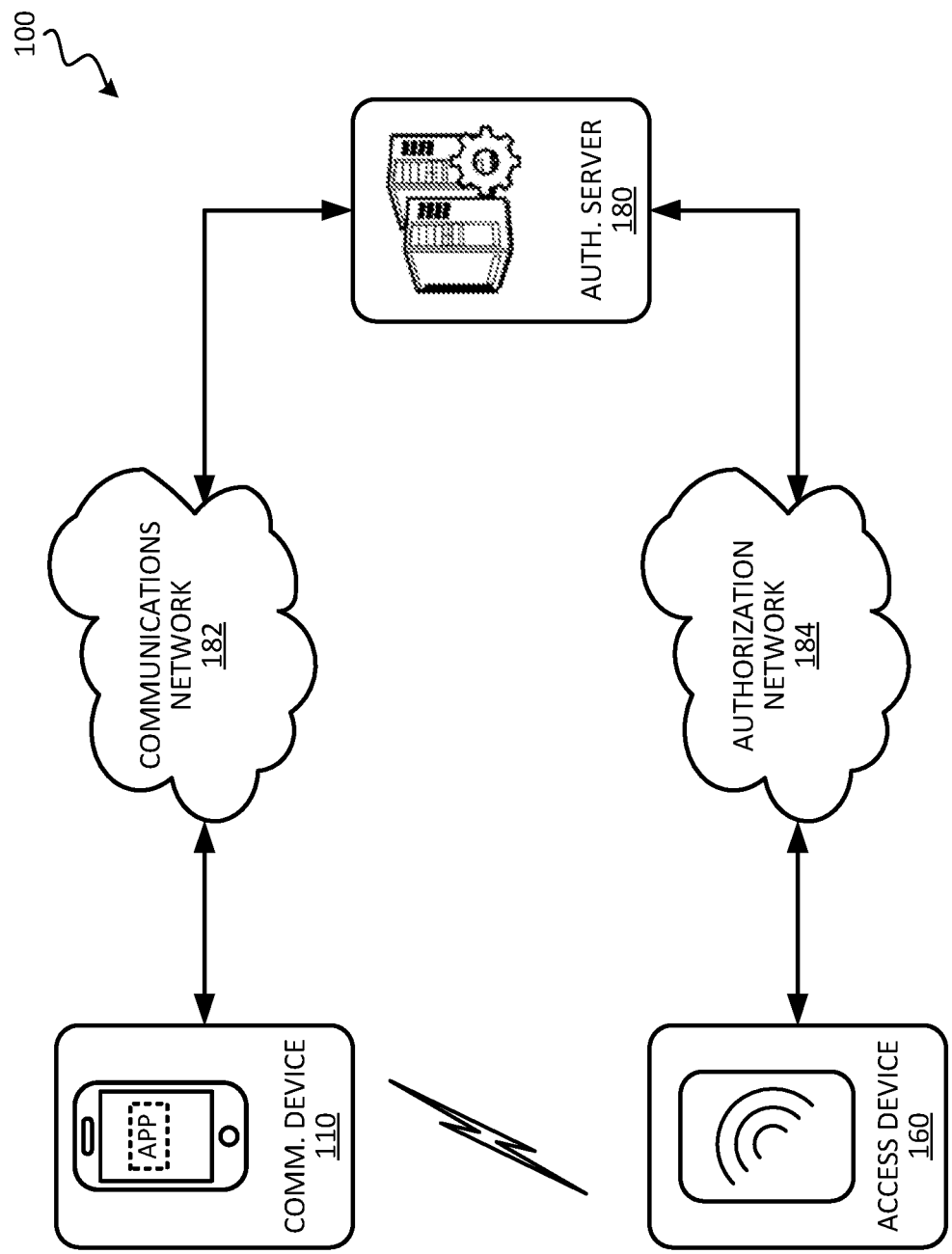
FIG. 1 illustrates a system for accessing a service, according to some embodiments.

One technique to mitigate against the threat of replay attack is to limit the amount of time that an access credential is valid for. For example, the access credential can be associated with a time-to-live threshold amount of time, and once that amount of time has expired, the access credential will become invalid and can no longer be used to authenticate the user. Thus, even if an unauthorized party comes into possession of a time-limited access credential, if the unauthorized party attempts to use the access credential beyond its time limit, the unauthorized party will not be able to gain access to services associated with the authorized user.

In order for an authorization entity to verify whether an access credential is being used within its time limit, a timestamp can be included in the access credential. The timestamp can reflect the time at which the access credential was generated. When the authorization entity receives the access credential, the authorization entity can retrieve the timestamp information, and determine the amount of time that has elapsed since the access credential was generated. This elapsed time can be compared with the time-to-live of the access credential to determine if the access credential has expired or not. If the access credential has expired, access to a service can denied even if the underlying account information (e.g., account identifier) is valid.

The effectiveness of such a technique to prevent replay attacks may depend on the reliability of the timestamp information included in the access credential. For example, if the timestamp information is not accurate, access to a service can be mistakenly denied even though the access credential has not expired yet. As another example, if the timestamp information included in the access credential can be manipulated by a user, the access credential can potentially be used beyond its time limit by setting the timestamp information in the access credential to a future point in time. Accordingly, some embodiments of the present invention relate to techniques for providing reliable timestamp information for use in an access credential.

Prior to discussing the details of some embodiments of the present invention, description of some terms may be helpful in understanding the various embodiments.

A "communication device" may be a device that includes one or more electronic components (e.g., an integrated chip) that can communicate with another device. For example, a communication device can be a computing device having at least one processor coupled to a memory that stores instructions or code for execution by the processor. Examples of a communication device may include a portable communication device. A "portable communication device" may be a communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, health monitoring device such as a fitness band, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer. In some embodiments, an issuer may refer to a provider of a software application.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for interacting with a communication device and for communicating with an authorization server. In some embodiments, an access device may communicate with an authorization server via a merchant computer or transaction processing network. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites or web servers, and the like. An access device may use any suitable contact or contactless, wired or wireless mode of operation to send or receive data from, or associated with, a communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a transaction processing network and/or an issuer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators: Approval—transaction was approved; Decline— transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "token" may include a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be format-preserving and may have a numeric format that conforms to the account identifiers used in existing transaction processing networks (e.g., ISO 8583 financial transaction message format). In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "limited-use key" or "LUK" may refer to a key that can be used for only a limited time or a limited number of transactions, and may need to be renewed or replenished when the limited usage has been exhausted. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds may include at least one of a number of transactions that the LUK can be used for, a time-to-live indicating the duration of time for which the LUK is valid, and/or a cumulative transaction amount indicating the total transaction amount summed across one or more transactions for which the LUK is valid, or any combination thereof.

A "limited-use threshold" may refer to a condition that limits the usage of a piece of information. A limited-use threshold may be exceeded or exhausted when the underlying condition is met. For example, a limited-use threshold may include a time-to-live that indicates an amount of time that a piece of information is valid for, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Details of some embodiments of the present invention will now be described.

FIG. 1 illustrates a system 100 for implementing a network service, according to some embodiments. System 100 may include a communication device 110 operated by a user, an access device 160 via which the user of communication device 110 may interact with to obtain a service associated with a service provider, and an authorization server 180 associated with the service provider which authenticates the user or communication device 110 to grant access to the service. Examples of services that can be provide by system 100 may include access to restricted content or information, access to an online account of a user, access to a network resource, access to a restricted area, access to goods or services related to a transaction, etc. Any of these services can be restricted such that only authenticated users can be granted access to them. For example, in order for a user to gain access to a service, the user may be requested to provide a valid access credential. The access credential may include account information identifying an account of the user associated with the service provider, and other authentication information that is used to authenticate the user.

Communication device 110 may communicate with authorization server 180 via a communications network 182 (e.g., internet, mobile or cellular network, etc.). For example, communication device 110 may communicate with authorization server 180 to download an access application. The access application may allow communication device 110 to interact with an access device to obtain a service associated with the service provider. In some embodiments, the access application can be downloaded from an application store associated with authorization server 180 or the service provider. Communication device 110 may also communicate with authorization server 180 from time to time to request and/or update account parameters use by the access application, and to synchronize communication device 110 with authorization server 180. For example, communication device 110 may obtain an authorization network time from authorization server 180 such that the clock and/or timing parameters of the access application are synchronized with authorization server 180.

When the user attempts to access a service using communication device 110, the user may launch the access application on communication device 110, and instruct the access application to generate an access credential that is used for authenticating the user and/or communication device 110 to the service provider. Communication device 110 may interact with access device 160, and provide the access credential to access device 160. For example, the access credential can be provided to access device 160 using a wired or wireless connection, or the access credential can be encoded in an image (e.g., QR code, bar code, etc.) that is displayed on communication device 110, which is then scanned or captured by access device 160.

Access device 160 may send the access credential to authorization sever 180 via authorization network 184 to authenticate the user and/or communication device 110. It should be understood that in some embodiments, authorization server 180 can be implemented as part of authorization network 184. When authorization sever 180 receives the access credential, authorization server 180 can determine the validity of the access credential, and if the access credential is valid, the user and/or communication device 100 can be granted access to the requested service.

According to some embodiments, the access credential may have a limited lifespan and may expire after a time-to-live amount of time. For example, the access credential may have a time-to-live of up to 5 minutes, 10 minutes, 15 minutes, or 30 minutes, etc. from when the access credential is generated, and after which the access credential will no longer be valid. To allow authorization server 180 to verify whether the access credential has expired, the access credential may include timestamp information indicating when the access credential was generated by the access application. Although A device time provided by a local clock application maintained by the communication device 110 can be used as the timestamp information, this local clock application is typically user adjustable, and the device time can be manipulated by a user by changing the settings on communication device 110. As such, using the device time provided by a local clock application directly as the timestamp in the access credential can lead to unreliable results. For example, a user may configure the local clock application to set the device time to a future point in time in an attempt to extend the life of the access credential beyond its valid usage limit.

Another option is to have the access application obtain an authorization network time from the authorization server 180 each time the access credential is generated. Because the authorization network time is provided by authorization server 180, a user would not be able to manipulate this time information received from authorization server 180. However, communication device 110 may not always have network connectivity. For example, communication device 110 can be a portable communication device, and the portable communication device can be transported to a location where network connectivity is limited or unavailable (e.g., underground, inside a building, a location with limited signal reception, etc.). As such, there can be instances in which communication device 110 cannot communicate with authorization server 180 to obtain the authorization network time when the access credential is being generated.

Figure 2:
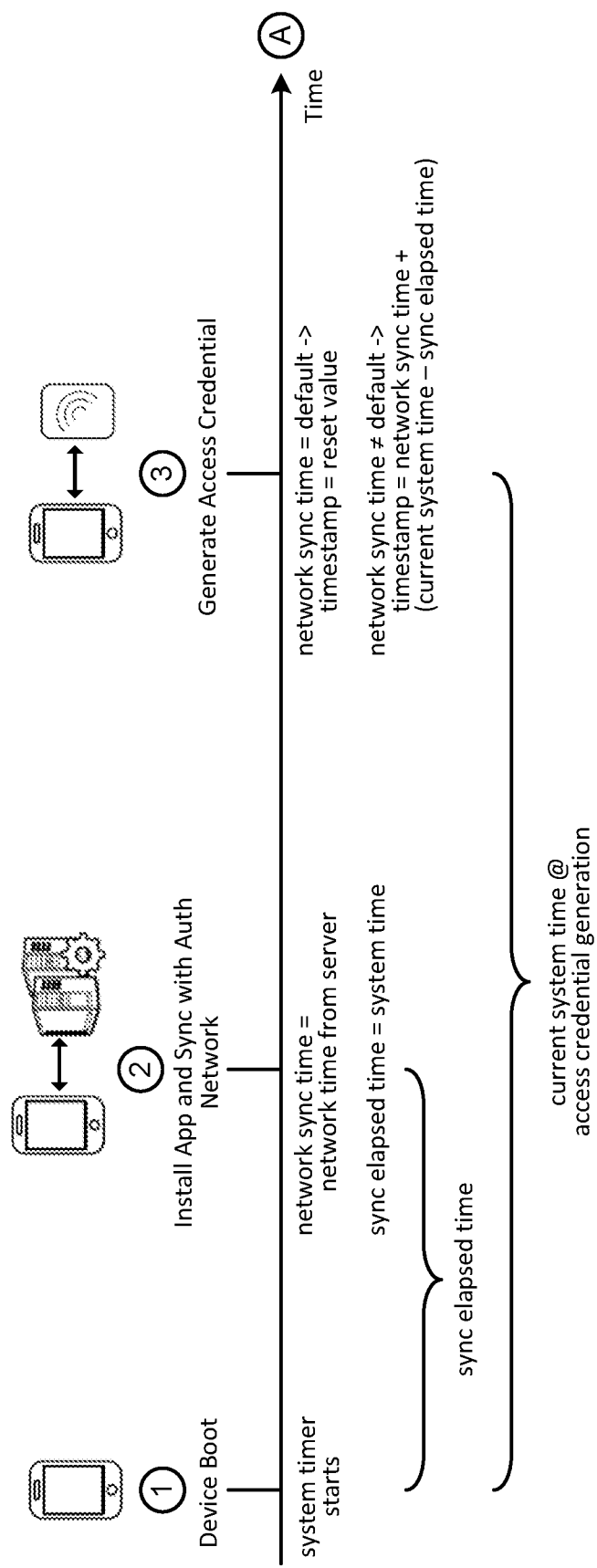
FIG. 2 illustrates a timing diagram of a technique to generate a timestamp for an access credential, according to some embodiments.

FIG. 2 illustrates a timing diagram of a technique to generate a reliable timestamp for use in an access credential, according to some embodiments. The timestamp generation technique shown in FIG. 2 can be more reliable than the techniques discussed above, because it does not require constant network connectivity to an authorization server, and does not use a local device time from a user configurable timer on the communication device directly as the timestamp information. It should be understood that the timeline shown in FIG. 2 may not necessarily be drawn to scale, and that the various events illustrated by the circled numeric designations can occur at different times than what is specifically shown.

At event ①, the communication device is powered on and boots up. The communication device may have a system timer such as a counter (e.g., implemented in hardware) that starts ticking from an initial value (e.g., zero) when the communication device is powered on. The system timer may be inaccessible by the user, and thus is not user configurable. The system timer will continue ticking as long the communication device is powered on. If the communication device is turned off, the system timer will restart from its initial value upon power being restored to the communication device. Hence, the system timer can be used to indicate how long the communication device has been powered on. For example, the counter value of the system timer can be converted to a time unit (e.g., number of hours, minutes, seconds, etc.) by multiplying the counter value with the duration of the periodic interval at which the counter is incremented.

At event ②, the user may communicate with the authorization network (e.g., authorization server) to download and install an access application associated with a service provider onto the communication device. In some embodiments, instead of downloading the access application from the authorization network, the access application can be downloaded from an application store. When the access application is installed on the communication device, the access application may communicate with the authorization network (e.g., authorization server) to synchronize the access application and the communication device with the authorization network. For example, the access application may receive an authorization network time from the authorization network when the communication device synchronizes with the authorization network. The authorization network time can be, for example, the current Universal Coordinated Time (UTC), the current local time at the authorization server, or the current time of an arbitrary clock maintained by the authorization server. The received authorization network time can be stored as an authorization network synchronization time on the communication device. Furthermore, the access application may store a system synchronization elapsed time on the communication device reflecting the system time of the system timer when the communication device synchronizes with the authorization network. Whenever the communication device communicates with the authorization network to synchronize with the authorization network (e.g., to request and/or update account parameters), the authorization network synchronization time and the system synchronization elapsed time stored on the communication device can be updated with the authorization network time received from the authorization network and the system time of the system timer, respectively.

At event ③, the communication device may interact with an access device to request access to a service from a service provider associated with the access device. The communication device may receive a request to generate an access credential to authenticate the user and/or communication device. The request can be initiated from the access device, or by the access application (e.g., in response to user input to generate the access credential). The access credential may include a timestamp to indicate when the access credential is generated.

To generate the timestamp for the access credential, the access application may retrieve the authorization network synchronization time and the system synchronization elapsed time stored on the communication device indicating the most recent time that the communication device had synchronized with the authorization network. The access application may determine whether the communication device has synchronized with the authorization network based on the value of the authorization network synchronization time. For example, if the authorization network synchronization time has a default value (e.g., zero), this may indicate that the communication device has not yet synchronized with the authorization network. In such a scenario, the communication device may not have reliable time information in synch with the authorization network. As such, the access application may generate an access credential with an indication that the access credential has unreliable timestamp information. For example, the access credential may provide this indication by setting the timestamp included in the access credential to a reset value (e.g., zero), and/or by setting a separate timestamp reliability flag included in the access credential to a value that indicates that the timestamp information is not reliable.

If the authorization network synchronization time has a non-default value (e.g., a non-zero value), this may indicate that the communication device has successfully synchronized with the authorization network. As such, the timestamp included in the access credential can be set to the to a sum of the authorization network synchronization time, and a difference between the current system time of the system timer of the communication device and the system synchronization elapsed time. The difference between the current system time of the system timer of the communication device and the system synchronization elapsed time reflects the amount of time that has elapsed since the most-recent time that the communication device has synchronized with the authorization network. Accordingly, by adding this amount of time to the authorization network synchronization time stored on the communication device and using the result as the timestamp information, a reliable timestamp in synch with the authorization network can be generated. In some embodiments, the access credential may provide an indication that the access credential has reliable timestamp information by having a timestamp with a non-reset value (e.g., non-zero value), and/or by setting a separate timestamp reliability flag included in the access credential to a value that indicates the timestamp information is reliable. This technique to generate the timestamp does not require the communication device to have an active network connection at the time of the access credential generation, because the information needed to generate the timestamp (e.g., most recent authorization network synchronization time, system timer information, etc.) are all locally available on the communication device. Furthermore, this technique to generate the timestamp is more reliable because it does not rely on time information that can be manipulated by a user.

In addition to the timestamp, the access credential generated by the access application may also include account information associated with an account of the user. For example, the account information may include an account identifier or a token that is used as a substitute for a real account identifier. The account credential may also include a cryptogram that is generated by encrypting the account information and/or the timestamp using an encryption key. In some embodiments, the encryption key can be a limited-use key that has its own set of usage restrictions. The access credential can then be provided to the access device to request authorization to access the requested service. In some embodiments, the access credential can be transmitted to the access device using a wired or wireless (e.g., NFC, WiFi, Bluetooth, etc.) connection. In some embodiments, the access application may encode the access credential in an image such as a QR code or a bar code, and the access application may provide the image to the access device by displaying the image on the communication device. In such scenarios, the access device may capture the image displayed on the communication device using a camera or other optical scanner (e.g., QR code reader or bar code reader). The access device may also decode the image to retrieve the underlying information of the access credential.

Once the access device obtains the access credential, the access device may send the access credential to an authorization server for verification. The authorization sever may verifying that the account information in the access credential identifies a valid account. The authorization sever may also verifying that cryptogram by regenerating the cryptogram using a copy of the encryption key and comparing the regenerated cryptogram with the cryptogram provided in the access credential. The authorization server may also determine whether the access credential has reliable timestamp information (e.g., via the value of the timestamp and/or the timestamp reliability flag).

If the access credential indicates that the timestamp information is reliable, the authorization server may compare the timestamp information with the current authorization network time at the authorization server, and calculate the amount of time that has elapsed since the access credential was generated. The authorization server may then determine whether the access credential is being used within its time-to-live threshold. If the access credential has not expired yet, and the account information and/or cryptogram are verified to be valid, the authorization can then grant authorization for the user and/or the communication device to access the requested service.

If the access credential indicates that the timestamp information may be unreliable, the authorization server may not be able to verify whether the access credential has expired or not because the timestamp information included in the access credential may not be accurate. In such scenarios, if the account information and/or the cryptogram are verified, the authorization server may request step-up authentication from the user. For example, the authorization server may request the user to enter a PIN, password, or passcode, etc., biometric information (e.g., fingerprint), or other user authentication information on the communication device or on the access device to provide an additional assurance that the user is authorized to access the service.

If the account information and/or cryptogram are invalid, or the access credential indicates that the timestamp is reliable but the access credential has expired, the authorization server may deny access to the service.

In the timeline shown in FIG. 2, the access application is able to generate a reliable timestamp based on the authorization network synchronization time stored on the communication device and the system timer information. However, as mentioned above, if the communication device is turned off, the system timer of the communication device may restart from its initial value upon the power being restored to the communication device. Thus, if the communication device is power cycled and the system timer is restarted, the difference between the current system time of the system timer and the system synchronization elapsed time previously stored on the communication device may not necessarily provide an accurate measurement of the amount of the time that has elapsed since the most recent synchronization event.

Figure 3:
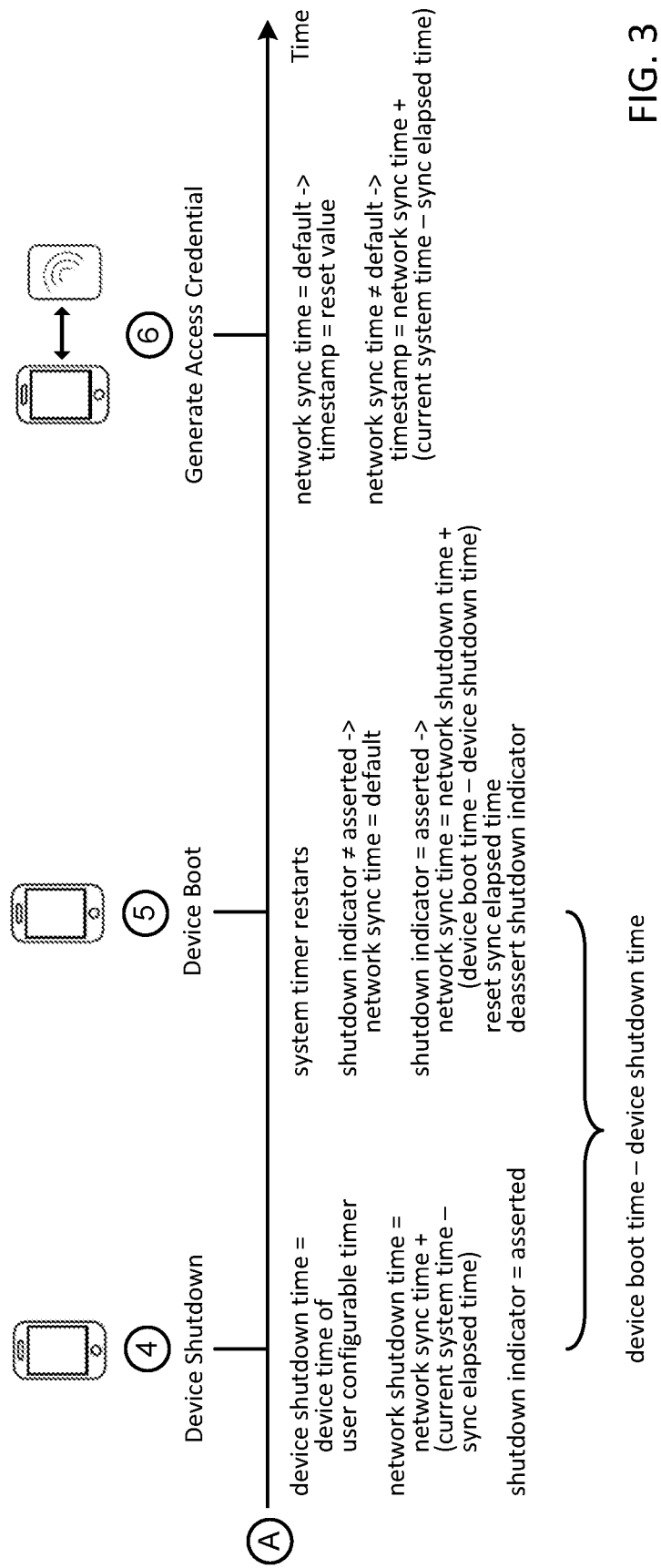
FIG. 3 illustrates a timing diagram of a technique to generate a timestamp for an access credential after power cycling of a communication device, according to some embodiments.

FIG. 3 illustrates a timing diagram of a technique to generate a reliable timestamp which addresses power cycling of the communication device, according to some embodiments. The timeline shown in FIG. 3 can be a continuation of the timeline shown in FIG. 2. It should be understood that the timeline shown in FIG. 3 may not necessarily be drawn to scale, and that the various events illustrated by the circled numeric designations can occur at different times than what is specifically shown.

At event ④, the communication device shuts down. For example, the shutdown may occur in response to the communication device receiving user input instructing the communication device to shut down (e.g., a user engaging the power button of the communication device). As part of the shutdown process, the access application or the communication device may execute a predetermined shutdown sequence. The predetermined shutdown sequence can be executed if the communication device has previously synchronized with the authorization network (e.g., if the authorization network synchronization time has a non-default value).

The predetermined shutdown sequence may include storing a local device shutdown time on the communication device reflecting a device time indicated by a user configurable timer of the communication device at the time when the communication device is being shut down. The user configurable timer can be, for example, a clock application that provides the local time or other time information. The predetermined shutdown sequence may also store an authorization network device shutdown time reflecting a sum of the most recent authorization network synchronization time stored on the communication device, and a difference between the current system time of the system timer when the communication device is being shut down and the system synchronization elapsed time previously stored on the communication device. This authorization network device shutdown time provides shutdown time information that is in synch with the authorization network, and represent the current authorization network time of the authorization network at the time the communication device is being shut down.

If both the local device shutdown time and the authorization network device shutdown time are successfully stored, the predetermined shutdown sequence may complete the predetermine shutdown sequence by setting a device shutdown indicator to an asserted state. The local device shutdown time, the authorization network device shutdown time, and the device shutdown indicator can be stored in in a non-volatile memory (e.g., flash memory) such that their values can be retained when the communication is turned off. In some embodiments, to reduce memory usage, the memory location used for storing the authorization network synchronization time can be reused to store the authorization network device shutdown time.

At event ⑤, the communication device is turned back on and boots up. The system timer of the communication device restarts from its initial value. As part of the boot up sequence, the access application or the communication device may determine whether the predetermined shutdown sequence was properly executed when the communication device was last shut down. For example, the device shutdown indicator can be checked to determine whether it is in the asserted state or the deasserted state. If the device shutdown indicator is in the deasserted state, this may indicate that the communication device was not properly shutdown. This may occur, for example, if the battery of the communication device died prior to completion of the predetermined shutdown sequence, or the battery has drained down to a level that cannot provide sufficient power to execute the predetermined shutdown sequence. If it is determined that the predetermine shutdown sequence was not properly executed, the authorization network synchronization time stored on the communication device can be reset to its default value (e.g., zero). By resetting the authorization network synchronization time back to its default value, the access application can be informed that the communication device is no longer synchronized with the authorization network.

If the device shutdown indicator is in the asserted state when the communication device is turned back on to indicate that the predetermined shutdown sequence was properly executed, the authorization network synchronization time stored on the communication device can be set to a sum of the authorization network device shutdown time, and a difference between a current device time indicated by the user configurable timer (e.g., clock application) when the communication device is turned back on and the local device shutdown time previously stored on the communication device. The difference between the current device time indicated by the user configurable timer and the local device shutdown time previously stored on the communication device reflects the amount of time that the device was turned off. Although the user configurable timer can generally be manipulated by a user, the user configurable timer cannot be manipulated while the communication device is turned off. As such, the difference between the current device time when the communication device is turned back on and the local device shutdown time can provide a reliable measurement of how long the communication device has been turned off. According to some embodiments, the user configurable timer of the communication device can maintain time while the communication device is turned off by using a real-time clock (RTC) that runs on a different power source (e.g., a capacitor) than the main battery of the communication device such that the RTC can continue running even when the main battery is completely drained. In some embodiments, the user configurable timer of the communication device can obtain the current device time when the communication device boots by using a network time protocol (NTP). For example, the communication device can obtain a local time provided by a cellular network when the communication device boots up. Once the authorization network synchronization time stored on the communication device is updated, the system synchronization elapsed time can be reset to zero, and the device shutdown indicator can also be reset back to a deasserted state.

At event ⑥, the communication device, after going through a power cycle of being turned off and then back on, may interact with an access device to request access to a service from a service provider associated with the access device. The communication device may receive a request to generate an access credential to authenticate the user and/or communication device. To generate the timestamp for the access credential, the access application may retrieve the authorization network synchronization time and the system synchronization elapsed time stored on the communication device indicating the most recent time that the communication device had synchronized with the authorization network. The access application may determine whether the communication device has reliable time information that is in synch with the authorization network. For example, if the authorization network synchronization time has a default value (e.g., zero), this may indicate that the communication device has not yet synchronized with the authorization network, or that the predetermined shutdown sequence did not complete properly to cause the authorization network time information on the communication device to become unreliable. In such a scenario, the access application may generate an access credential with an indication that the access credential has unreliable timestamp information. For example, the access credential may provide this indication by setting the timestamp included in the access credential to a reset value (e.g., zero), and/or by setting a separate timestamp reliability flag included in the access credential to a value that indicates that the timestamp information is not reliable.

If the authorization network synchronization time has a non-default value (e.g., a non-zero value), this may indicate that the communication device has reliable time information that is in synch with the authorization network (e.g., the communication device has synchronized with the authorization network after being turned back on, or the predetermined shutdown sequence was properly executed to update the authorization network time information stored on the communication device when the communication device was shut down). As such, the timestamp included in the access credential can be set to the to a sum of the authorization network synchronization time, and a difference between the current system time of the system timer of the communication device and the system synchronization elapsed time. In some embodiments, the access credential may provide an indication that the access credential has reliable timestamp information by having a timestamp with a non-reset value (e.g., non-zero value), and/or by setting a separate timestamp reliability flag included in the access credential to a value that indicates the timestamp information is reliable. The access device can then obtain the access credential and authentication the user and/or communication device using techniques similar to those discussed above.

Figure 4:
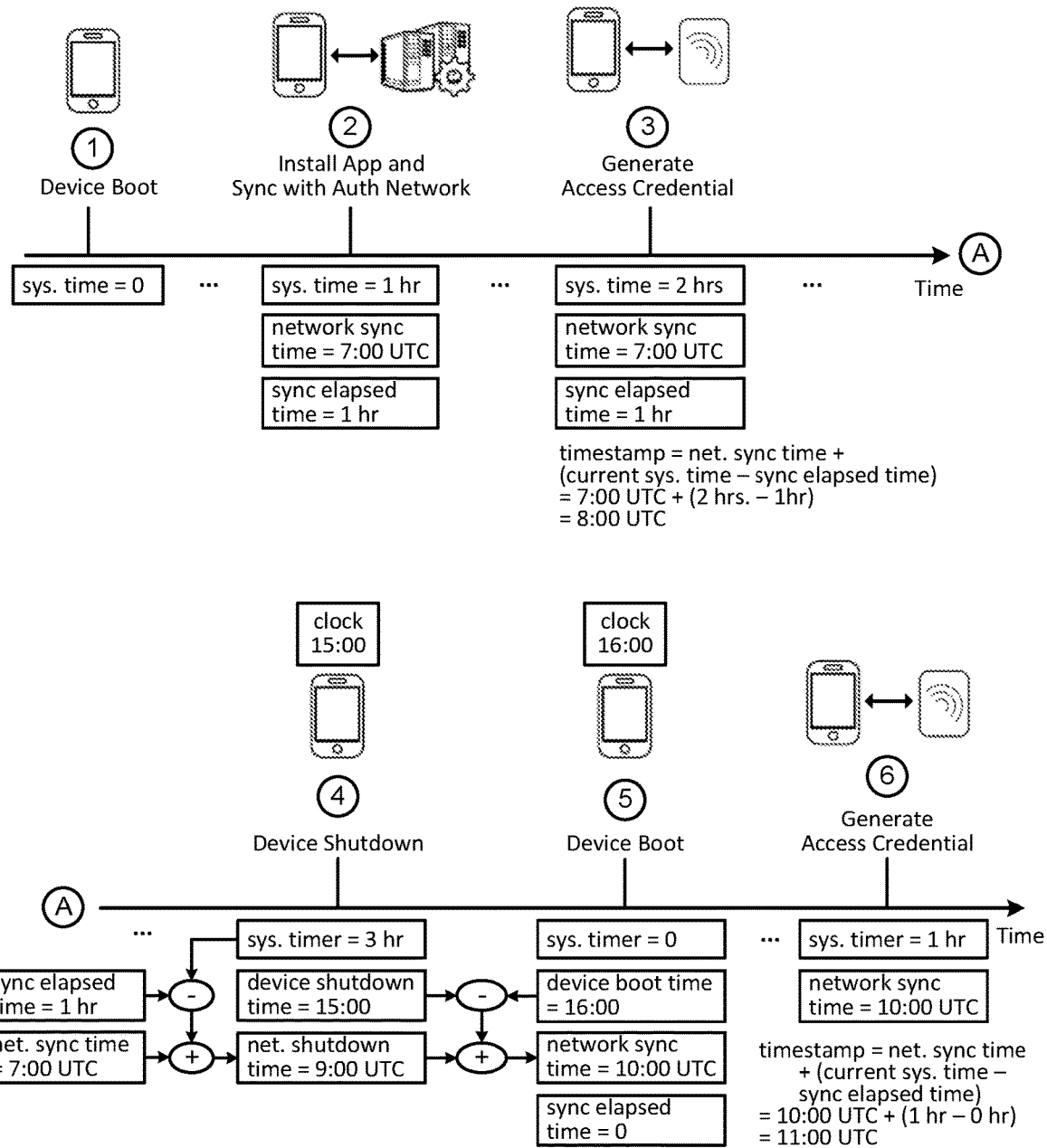
FIG. 4 illustrates an example of a timing diagram for generating access credentials, according to some embodiments.

For a better understanding of the reliable timestamp techniques described above, FIG. 4 shows an example timing diagram of generating access credentials with example values for the various timing parameters, according to some embodiments. The timing diagram shown in FIG. 4 is based on FIGS. 2-3 discussed above. It should be understood that the timeline shown in FIG. 4 may not necessarily be drawn to scale, and that the various events illustrated by the circled numeric designations can occur at different times and the various timing parameters may have different values than what is specifically shown.

At event ①, the communication device is powered on and boots up. The system timer of the communication device starts ticking from an initial value of zero. At event ②, after the device has been turned on for an hour, the user may download and install an access application associated with a service provider onto the communication device. At this time, the system timer may reflect a value corresponding to 1 hour because the communication device has been powered on for an hour. When the access application is installed on the communication device, the access application may communicate with the authorization network to synchronize the access application and the communication device with the authorization network, and the access application may receive an authorization network time from the authorization network. In some embodiments, the access application may synchronize with the authorization network whenever the access application communicates with the authorization network, for example, to request and/or update account parameters used by the access application. In this example, the authorization network time received from the authorization network at event ② is 7:00 UTC time. The access application may store this as the authorization network synchronization time. Additionally, the access application may store the current system time of the system timer (e.g., 1 hour) as the system synchronization elapsed time.

At event ③, after the communication device has been powered on for two hours, the communication device may interact with an access device to request access to a service from a service provider associated with the access device. At this time, the system timer has a value corresponding to 2 hours because the communication device has been powered on for two hours. To generate the timestamp for the access credential, the access application may retrieve the authorization network synchronization time previously stored on the communication device (e.g., 7:00 UTC) and the system synchronization elapsed time previously stored on the communication device (e.g., 1 hour). Since the authorization network synchronization time has a non-default value, the access application can determine that the communication device has reliable time information that is in synch with the authorization network. As such, the timestamp included in the access credential can be set to the to a sum of the authorization network synchronization time (e.g., 7:00 UTC), and a difference between the current system time of the system timer of the communication device and the system synchronization elapsed time (e.g., 2 hours–1 hour=1 hour). Thus, the timestamp included in the access credential generated at event ③ may have a value of 8:00 UTC, which is the authorization network time at the authorization server when the access credential at event ③ is generated.

At event ④, after the communication device has been on for three hours, the communication device is powered down. At this time, the system timer may have a value corresponding to 3 hours because the communication device has been powered on for three hours. As part of a predetermined shutdown sequence, the communication device may store a local device shutdown time on the communication device reflecting a device time indicated by a user configurable timer (e.g., clock application) of the communication device. In the example shown, the user configurable timer on the communication device may have a device time of 15:00 when the communication device is powered down. Thus, the local device shutdown time stored on the communication device may have a value of 15:00. This device time may correspond to a local time at the location of the communication device.

The predetermined shutdown sequence may also store an authorization network device shutdown time reflecting a sum of the most recent authorization network synchronization time stored on the communication device (e.g., 7:00 UTC), and a difference between the current system time of the system timer and the system synchronization elapsed time previously stored on the communication device (e.g., 3 hours−1 hour=2 hours). Thus, the authorization network device shutdown time stored on the communication device may have a value of 9:00 UTC. This authorization network device shutdown time may correspond to the authorization network time at the authorization server when the communication device is powered down.

At event ⑤, an hour after the communication device was powered down, the communication device is turned back on and boots up. The system timer of the communication device restarts from its initial value of zero. The device time indicated by a user configurable timer (e.g., clock application) of the communication device may have a time of 16:00 when the communication device is turned back on. The communication device may obtain this device time from a RTC clock or via a NTP protocol. Since the predetermined shutdown sequence was properly executed at event ④, the authorization network synchronization time stored on the communication device is updated to be the sum of the authorization network device shutdown time (e.g., 9:00 UTC), and a difference between a current device time indicated by the user configurable timer and the local device shutdown time previously stored on the communication device (e.g., 16:00−15:00=1 hour). Thus, the authorization network synchronization time stored on the communication device can be updated to have a value of 10:00 UTC. The system synchronization elapsed time is also reset back to zero.

At event ⑥, after the communication device has been turned back on for an hour, the communication device may interact with an access device to request access to a service from a service provider associated with the access device. At this time, the system timer may have a value corresponding to 1 hour because the communication device has been powered on for one hour. To generate the timestamp for the access credential, the access application may retrieve the authorization network synchronization time (e.g., 10:00 UTC) and the system synchronization elapsed time (e.g., 0 hour) stored on the communication device. Since the authorization network synchronization time has a non-default value, the access application can determine that the communication device has reliable time information that is in synch with the authorization network. As such, the timestamp included in the access credential can be set to the to a sum of the authorization network synchronization time (e.g., 10:00 UTC), and a difference between the current system time of the system timer of the communication device and the system synchronization elapsed time (e.g., 1 hour−0 hour=1 hour). Thus, the timestamp included in the access credential generated at event ⑥ may have a value of 11:00 UTC, which is authorization network time at the authorization server when the access credential at event ⑥ is generated.

Figure 5:
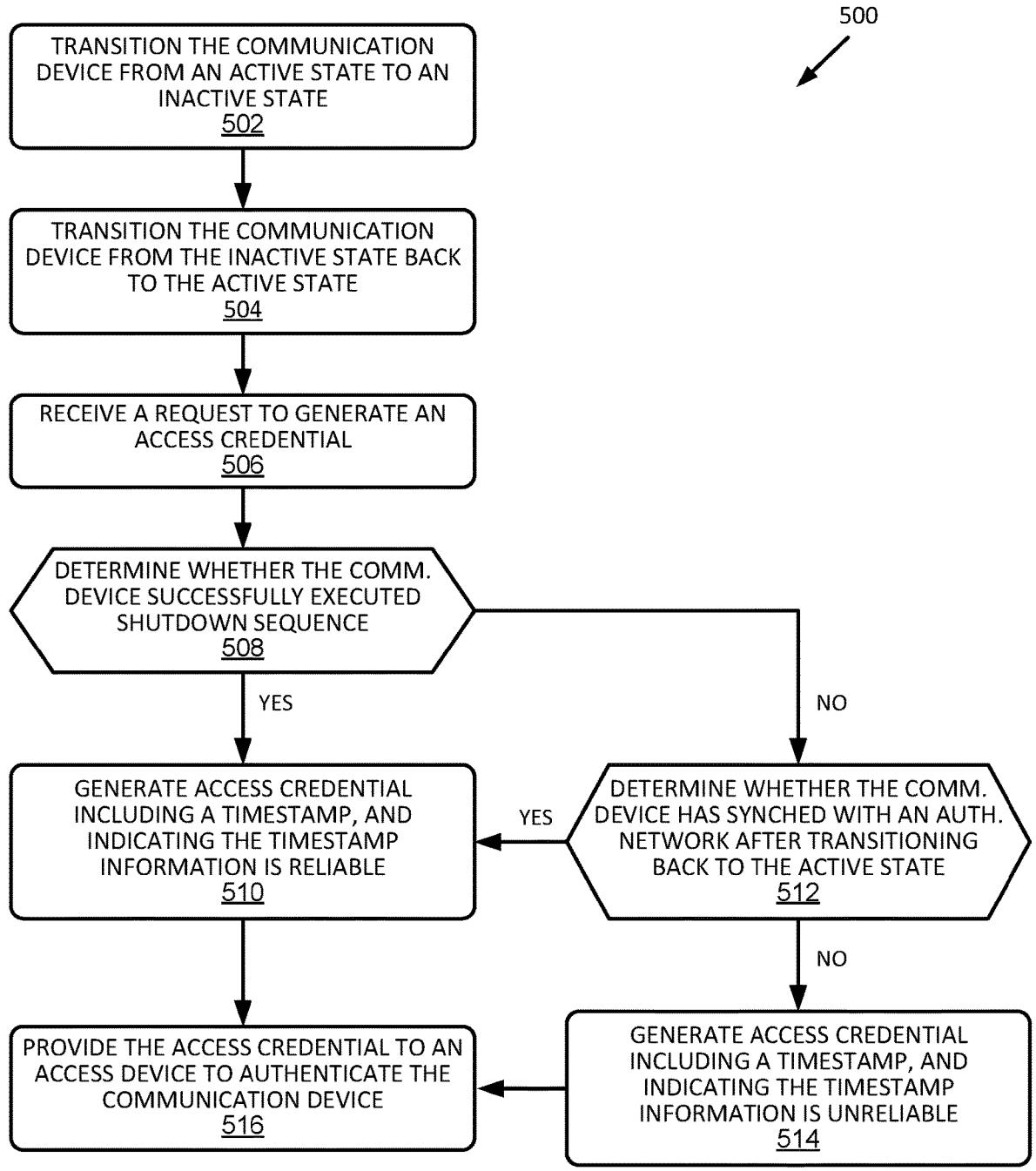
FIG. 5 illustrates a flow diagram of a process to generate an access credential, according to some embodiments.

FIG. 5 illustrates a flow diagram of a process 500 that can be performed by a communication device, according to some embodiments. At block 502, the communication device is transitioned from an active state (e.g., power on) to an inactive state (e.g., power off). For example, the communication device may receive an instruction from the user to shut down the communication device, or the battery of the communication device may have reached a minimum threshold to cause an automatic shutdown of the communication device. In some embodiments, as part of transitioning the communication device to the inactive state, the communication device may attempt to execute a predetermined shutdown sequence.

At block 504, the communication device is transitioned from the inactive state back to the active state. For example, the communication device may receive an instruction from the user to power on the communication device, and this may occur after the battery of the communication device has been recharged. At block 506, subsequent to transitioning back to the active state, the communication device may receive a request to generate an access credential that is used by an authorization network to authenticate a user and/or the communication device to grant access to a service.

At block 508, process 500 may determine whether the communication device successfully executed a predetermined shutdown sequence when the communication device transitioned to the inactive state at block 502 (e.g., by checking the state of a device shutdown indicator). If it is determined that the communication device successfully executed a predetermined shutdown sequence, then the communication device can be assumed to have reliable time information that is in synch with the authorization network. As such, at block 510, process 500 can generate an access credential including a timestamp indicating the time at which the access credential is generated. In some embodiments, the access credential may provide an indication that the access credential has reliable timestamp information (e.g., by having a non-reset value in the timestamp).

If it is determined that the communication device did not properly execute the predetermined shutdown sequence, process 500 may determine whether the communication device has synchronized with the authorization network subsequent to transitioning back to the active state at block 512 (e.g., by checking the value of the authorization network synchronization time stored on the communication device). If it is determined that the communication device has synchronized with the authorization network subsequent to transitioning back to the active state, then the communication device can be assumed to have reliable time information that is in synch with the authorization network. As such, process 500 can continue to block 510 to generate an access credential with reliable timestamp information.

If it is determined that the communication device has not yet synchronized with the authorization network subsequent to transitioning back to the active state and the predetermined shutdown sequence was not executed properly when the communication device was last transitioned to the inactive state, then the communication device can be assumed to not have reliable time information. In such a scenario, process 500 can still generate an access credential at block 514, but the access credential may provide an indication that the access credential has unreliable timestamp information (e.g., by having a reset value in the timestamp). At block 516, the access credential is provided to an access device associated with the authorization network to authenticate the user and/or communication device.

Figure 6:
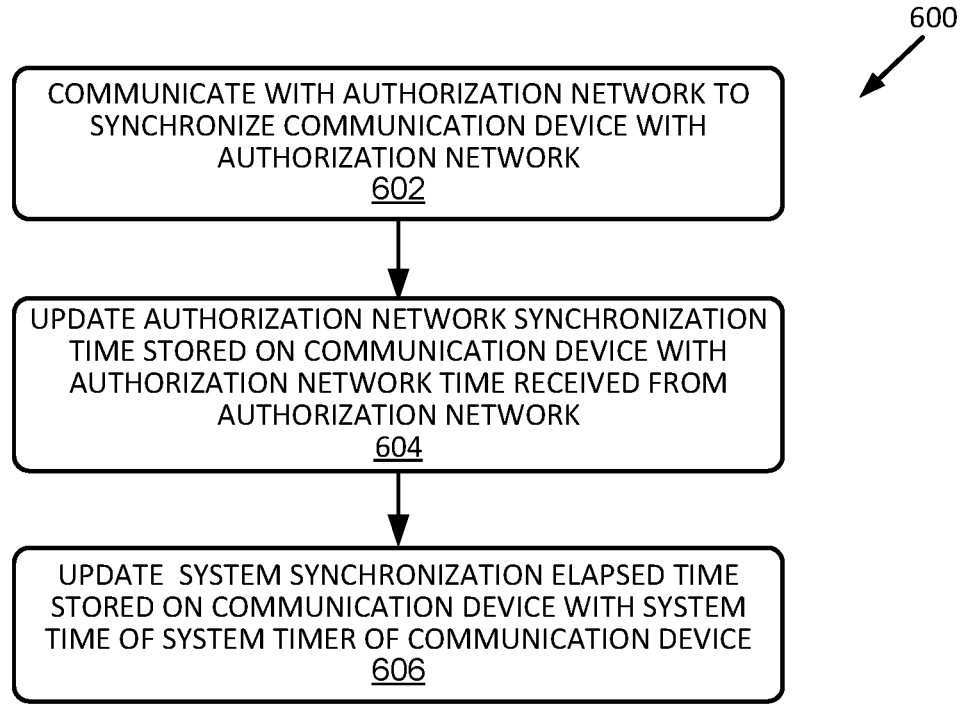
FIG. 6 illustrates a flow diagram of a process to synchronize time information between a communication device and an authorization network, according to some embodiments.

FIG. 6 illustrates a flow diagram of a process 600 that can be performed by a communication device to synchronize the time information stored on the communication device with an authorization network (e.g., authorization server), according to some embodiments. Process 600 can be performed from time to time when the communication device has network connectivity and can communicate with the authorization server. At block 602, the communication device may communicate with the authorization network to synchronize the communication device with the authorization network. This may occur according to a predetermined schedule as a background task, or when the user interacts with the access application associated with the authorization network. At block 604, the communication device may store an authorization network synchronization time on the communication device. The authorization network synchronization time can be updated with an authorization network time received from the authorization network when the communication device synchronizes with the authorization network. At block 606, the communication device may further store a system synchronization elapsed time on the communication device. The a system synchronization elapsed time can be updated with a current system time of the system timer of the communication device when the communication device synchronizes with the authorization network.

Figure 7:
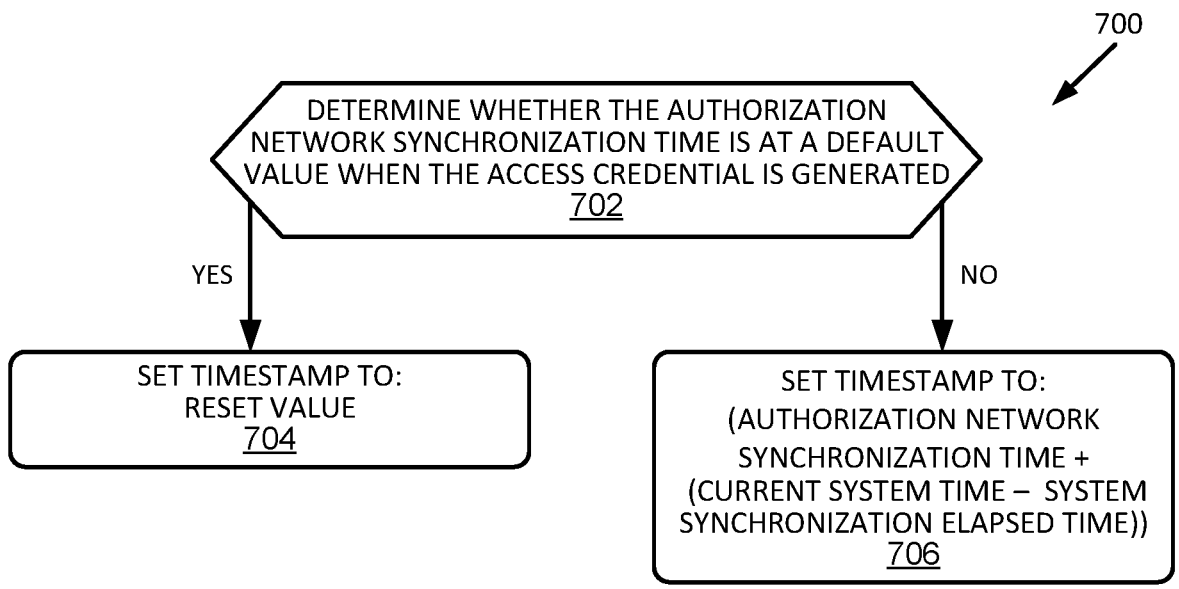
FIG. 7 illustrates a flow diagram of a process to generate a timestamp for an access credential, according to some embodiments.

FIG. 7 illustrates a flow diagram of a process 700 that can be performed by a communication device to generate a timestamp for an access credential, according to some embodiments. For example, process 700 can be performed when a user uses an access application on the communication device to request access to a service. At block 702, process 700 may determine whether the authorization network synchronization time stored on the communication device is at a default value (e.g., zero) at the time the access credential is being generated. If it is determined that the authorization network synchronization time has a default value, then at block 704, the timestamp for inclusion in the access credential can be set to a reset value (e.g., zero). By having a reset value as the timestamp information, an authorization server can be informed that the timestamp information in the access credential is not reliable, and that additional authentication measure can be taken before granting access to the requested service. If it is determined that the authorization network synchronization time has a non-default value, then at block 706, the timestamp for inclusion in the access credential can be set to a to a sum of the authorization network synchronization time stored on the communication device, and a difference between a current system time of the system timer of the communication device when the access credential is generated and the system synchronization elapsed time stored on the communication device.

Figure 8:
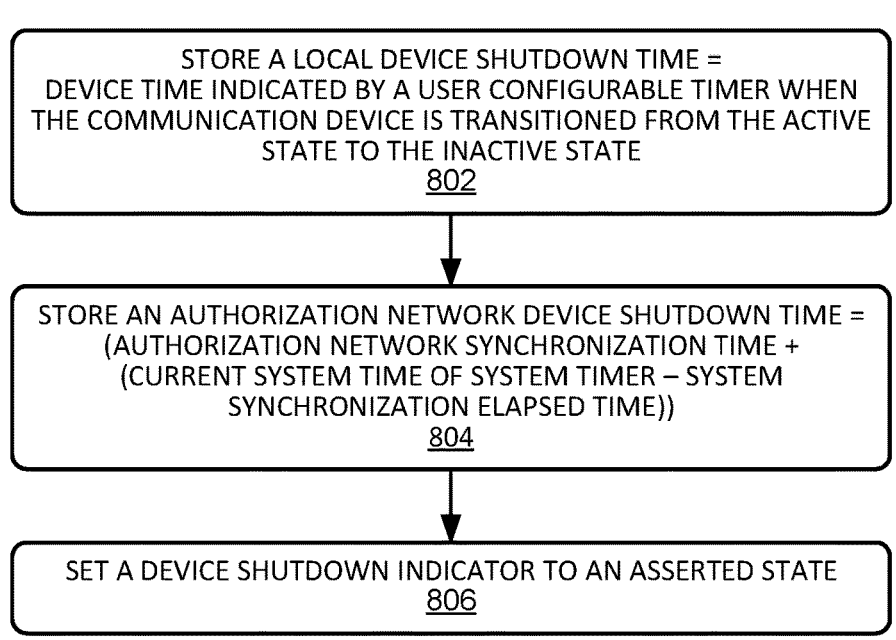
FIG. 8 illustrates a flow diagram of a predetermined shutdown sequence, according to some embodiments.

FIG. 8 illustrates a flow diagram of a process 800 of a predetermined shutdown sequence that can be performed by a communication device, according to some embodiments. The predetermined shutdown sequence can be performed when the communication device transitions from an active state to an inactive state to maintain synchrony with an authorization network. If the communication device is not currently synchronized with the authorization network (e.g., the authorization network synchronization time has a default value) when the communication device is transitioned to the inactive state, then it may be unnecessary to execute the predetermined shutdown sequence because the communication device is not in synch with the authorization anyway. Thus, in some embodiments, the predetermined shutdown sequence can be executed only if the authorization network synchronization time stored on the communication device has a non-default value when the communication device is transitioned from the active state to the inactive state.

At block 802, process 800 may store a local device shutdown time on the communication device reflecting a device time indicated by a user configurable timer of the communication device when the communication device is transitioned from the active state to the inactive state. The user configuration timer can be, for example, a clock application that displays a time on the communication device. In some embodiments, this device time can be the current local time of the location of the communication device. At block 804, process 800 may store an authorization network device shutdown time reflecting a sum of the authorization network synchronization time, and a difference between a current system time of the system timer of the communication device when the communication device is transitioned from the active state to the inactive state and the system synchronization elapsed time stored on the communication device. At block 806, process 800 may set a device shutdown indicator to an asserted state. This device shutdown indicator can be checked when the communication device transitions back to the active state to determine if the predetermined shutdown sequence was properly executed when the communication device was last transitioned to the inactive state.

Figure 9:
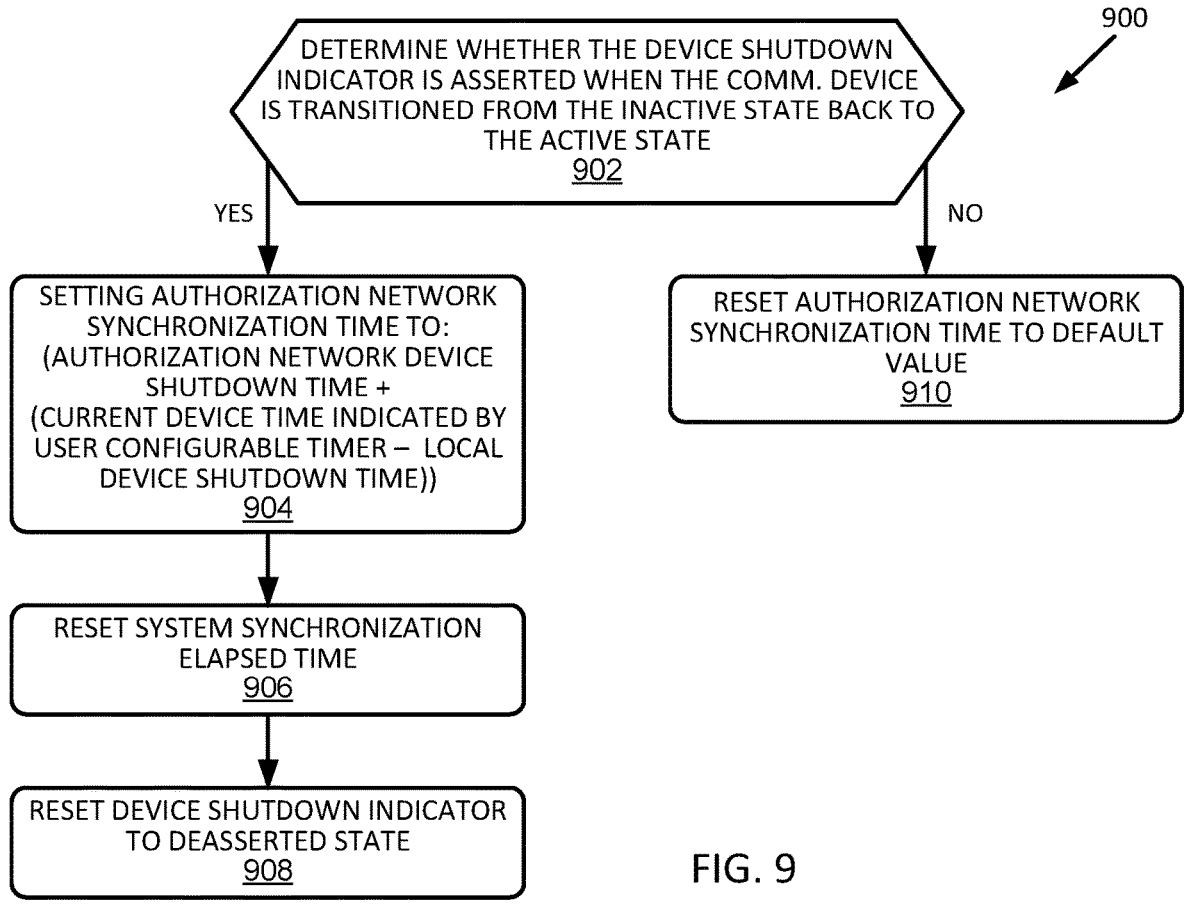
FIG. 9 illustrates a flow diagram of a boot sequence, according to some embodiments.

FIG. 9 illustrates a flow diagram of a process 900 of a boot sequence that can be performed by a communication device, according to some embodiments. For example, the boot sequence can be executed when the communication device is transitioned from an inactive state to an active state. At block 902, process 900 may determine whether the device shutdown indicator in the asserted state when the communication device is transitioned from the inactive state to the active state. The device shutdown indicator provides an indication of whether the predetermined shutdown sequence was properly executed when the communication device was last transitioned to the inactive state. At block 910, if the device shutdown indicator is not in the asserted state when the communication device is transitioned from the inactive state to the active state, then the authorization network synchronization time stored on the communication device is reset to its default value.

At block 904, if the device shutdown indicator is in the asserted state when the communication device is transitioned from the inactive state to the active state, then the authorization network synchronization time stored on the communication device can be set to a sum of the authorization network device shutdown time previously stored on the communication device, and a difference between a current device time indicated by the user configurable timer of the communication device when the communication device is transitioned from the active state to the inactive state and the local device shutdown time previously stored on the communication device. At block 906, process 900 may reset the system synchronization elapsed time (e.g., to zero). At block 908, process 900 may also reset the device shutdown indicator to a deasserted state.

Figure 10:
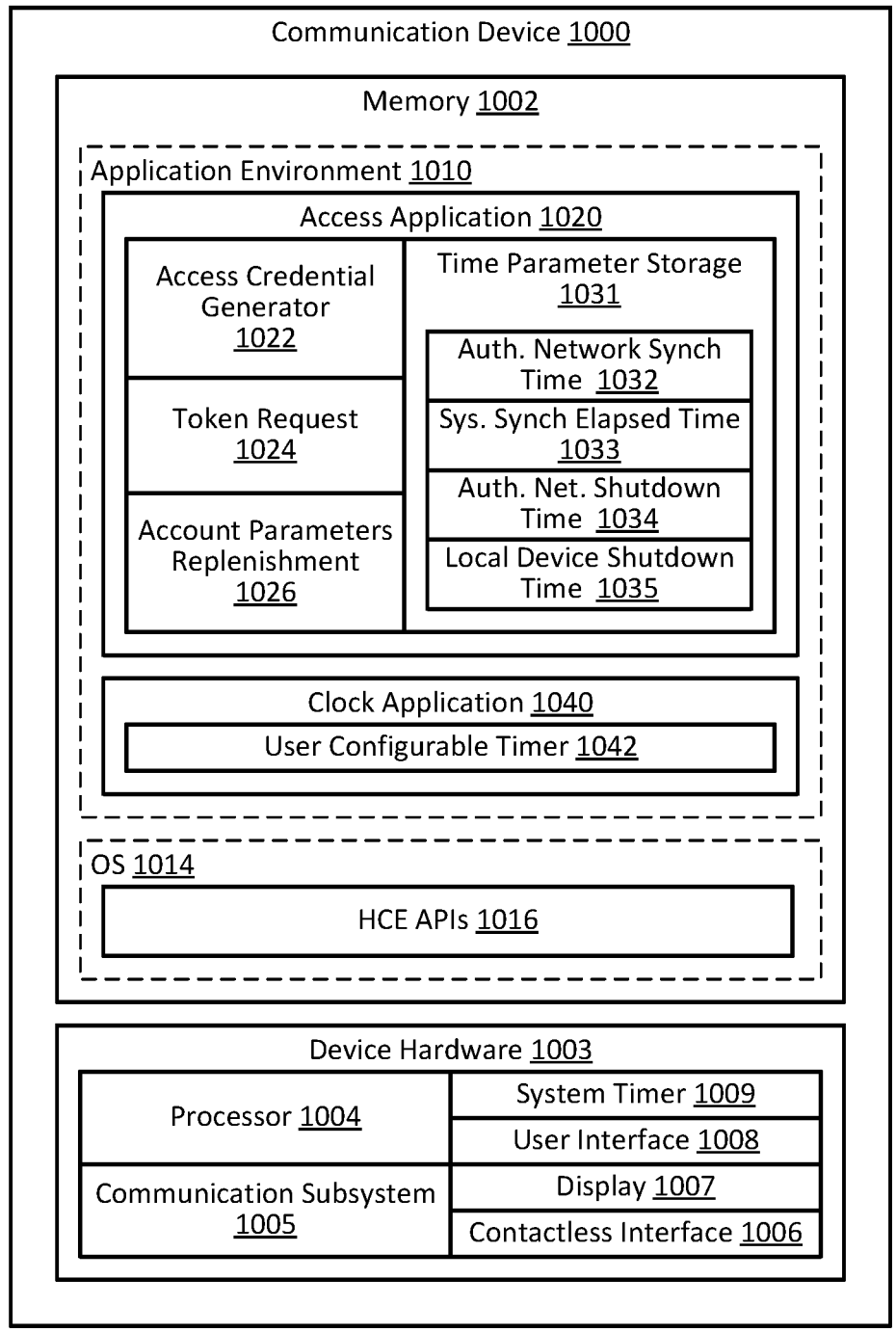
FIG. 10 illustrates a block diagram of a communication device, according to some embodiments.

FIG. 10 illustrates a block diagram of a communication device 1000 in which some embodiments of the processes described herein can be implemented. Communication device 1000 can be, for example, a portable communication device such as a mobile phone, a wearable device, an automobile, or other communication device that can be transported by or with a user.

Communication device 1000 may include device hardware 1003 coupled to a memory 1002. Device hardware 1003 may include a processor 1004, a communication subsystem 1005, use interface 1008, and a display screen 1007 (which may be part of user interface 1008). In some embodiments, device hardware 1003 may include a contactless interface 1008. Device hardware 1003 may also include a system timer 1009 such as a hardware counter that counts or ticks when the communication device is powered or in an active state. In some embodiments, system timer can be implemented in software.

Processor 1004 can be implemented as one or more integrated circuits (e.g., one or more single core or multicore microprocessors and/or microcontrollers), and is used to control the operation of communication device 1000. Processor 1004 can execute a variety of programs in response to program code or computer-readable code stored in memory 1002, and can maintain multiple concurrently executing programs or processes. Communications subsystem 1005 may include one or more RF transceivers and/or connectors that can be used by communication device 1000 to communicate with other devices and/or to connect with external networks. User interface 1008 can include any combination of input and output elements to allow a user to interact with and invoke the functionalities of communication device 1000. In some embodiments, display screen 1007 may be part of user interface 1008, and can be a touch screen that accepts user input.

Contactless interface 1006 may include one or more RF transceivers to interact with a contactless reader of an access device to conduct a transaction (e.g., payment transaction, access transaction, information exchange, etc.). In some embodiments, contactless interface 1006 can be accessed by the operating system (OS) 1014 using host card emulation APIs 1016 without requiring the use of a secure element. In some embodiments, display 1007 can also be used as a contactless interface, for example, to perform transactions using QR codes, bar codes, etc.

Memory 1002 can be implemented using any combination of any number of non-volatile memories (e.g., flash memory) and volatile memories (e.g., DRAM, SRAM), or any other non-transitory storage medium, or a combination thereof media. Memory 1002 may store a OS 1014 and an application environment 1010 where one or more applications reside including access application 1020 (e.g., wallet application, banking application, payment application, merchant application, transit application, service provider application, web browser, etc.) to be executed by processor 1004. In some embodiments, OS 1014 may implement a set of card emulation APIs 1016 that can be invoked by access application 1020 to operate contactless interface 1006 to interact with an access device. In some embodiments, application environment 1010 may also include a clock application 1040 that communication device 1000 uses to keep time. Clock application 1040 may implement a user configurable timer 1042 that a user can configure to display time information on communication device 1000. For example, user configurable timer 1042 can be invoked to display a local time on communication device 1000.

According to some embodiments, access application 1020 can implement security-sensitive functions such as token request function 1024, account parameters replenishment function 1026, and an access credential generator 1022, etc. In some embodiments, access credential generator may include a cryptogram generation function. Token request function 1024 can be invoked to request a token from a remote server (e.g., an authorization server such as a cloud-based transaction server, token server, issuer or host processing system, etc.). The token can be used as a substitute for a real account identifier to conduct transactions, for example, by sending the token to an access device that forwards the token to an authorization server. The authorization server can then map the token back to the account identifier to identify the account of the user. Using a token instead of a real account identifier can be more secure because the real account identifier is not transmitted when conducting a transaction. Token request function 1024 can be invoked, for example, at enrollment time to request an initial token, or when the lifespan of the current token has expired.

Account parameters replenishment function 1026 can be invoked to replenish or renew account parameters such as a limited-use key from a remote server (e.g., an authorization server such as a cloud-based transaction server, token server, issuer or host processing system, etc.). At the time of a transaction, the limited-use key can be used to generate a cryptogram that is provided to an access device to conduct the transaction. The limited-use key may be associated with a set or one or more limited-use thresholds (e.g., valid for a predetermined period of time, predetermined number of transactions, and/or predetermined cumulative transaction amount) to limit the usage of the LUK. When one or more of the limited-use thresholds of the LUK has expired or is about to expire, account parameters replenishment function 1026 can be invoked to request a new LUK.

Access credential generator 1022 can be invoked at transaction time to generate an access credential. The access credential may include an account identifier or a token, a cryptogram generated by a cryptogram generation function of the access credential generator 1022, and/or a timestamp indicating the time at which the access credential is generated. The access credential may also include other transaction information such as an application transaction counter value that counts the number of transactions conducted from the access application, etc. In some embodiments, the cryptogram can be generated by receiving dynamic transaction data from the access device (e.g., transaction amount, transaction date, unpredictable number, etc.), and encrypting the dynamic transaction data with the LUK. In some embodiments, the cryptogram can be generated by encrypting a static string using the LUK (e.g., if the access device does not support transmission of dynamic data to the communication device). The cryptogram can also be generated by encrypting the timestamp of the access credential, or by encrypting any combination of the above data elements.

Access credential generator 1022 can package the access credential in a suitable form that can be provided to an access device. For example, access credential generator 1022 may package the access credential into one or more protocol messages for transmission to the access device. In some embodiments, access credential generator 1022 may encode the access credential into an image such as a QR code or bar code. The encoded image can be displayed on communication device 1000, and the access device may capture or scan the encoded image to obtain the access credential.

According to some embodiments, the timestamp generation techniques described herein can be used to provide a reliable timestamp for the access credential. Access application 1020 may provide timing parameters storage function 1031 to store various timing parameters and time information used for generating a reliable timestamp in synch with an authorization server. For example, timing parameters storage function 1031 may store an authorization network synchronization time 1032, a system synchronization elapsed time 1033, an authorization network shutdown time 1034, and/or a local device shutdown time 1035.

Authorization network synchronization time 1032 is used to record the most recent authorization network time received from an authorization network when communication device 1000 synchronizes with the authorization network (e.g., authorization server). Communication device 1000 may synchronize with the authorization network, for example, when communication device 1000 communicates with the authorization network to request a token, to perform account parameters replenishment, or otherwise interact with the authorization network. System synchronization elapsed time 1035 is used to record the system time of system timer 1009 when the communication device 1000 synchronizes with the authorization network, and provides an indication of how long the communication device 1000 has been turned on or in an active state when the most recent synchronization event occurs. Authorization network shutdown time 1034 is used to record the authorization network time when the communication device 1000 is powered down or transitioned to an inactive state. Because communication device 1000 may not always have network connectivity when communication device 1000 is transitioned to the inactive state, authorization network shutdown time 1034 can be derived from the authorization network synchronization time 1032, the system synchronization elapsed time 1035, and the system time of the system timer at the time of transition. Local device shutdown time 1035 is used to record the local device time of user configurable timer 1042 when communication device 1000 is powered down or transitioned to the inactive state.

In some embodiments, authorization network shutdown time 1034 and local device shutdown time 1035 can be stored in a non-volatile memory (e.g., flash memory) such that their values can be retained when the communication device loses power or is turned off. Authorization network synchronization time 1032 and system synchronization elapsed time 1033 can be stored in volatile (e.g., RAM) or non-volatile memory. In some embodiments, the memory location of authorization network synchronization time 1032 can be the same memory location as the authorization network shutdown time 1034, because the value of authorization network synchronization time 1032 is not needed once the authorization network shutdown time 1034 is determined when the communication device transitions to an inactive state, and the authorization network shutdown time 1034 is not needed once the authorization network shutdown time 1034 at boot up is derived from the authorization network shutdown time 1034 when the communication device transitions to an active state.

Figure 11:
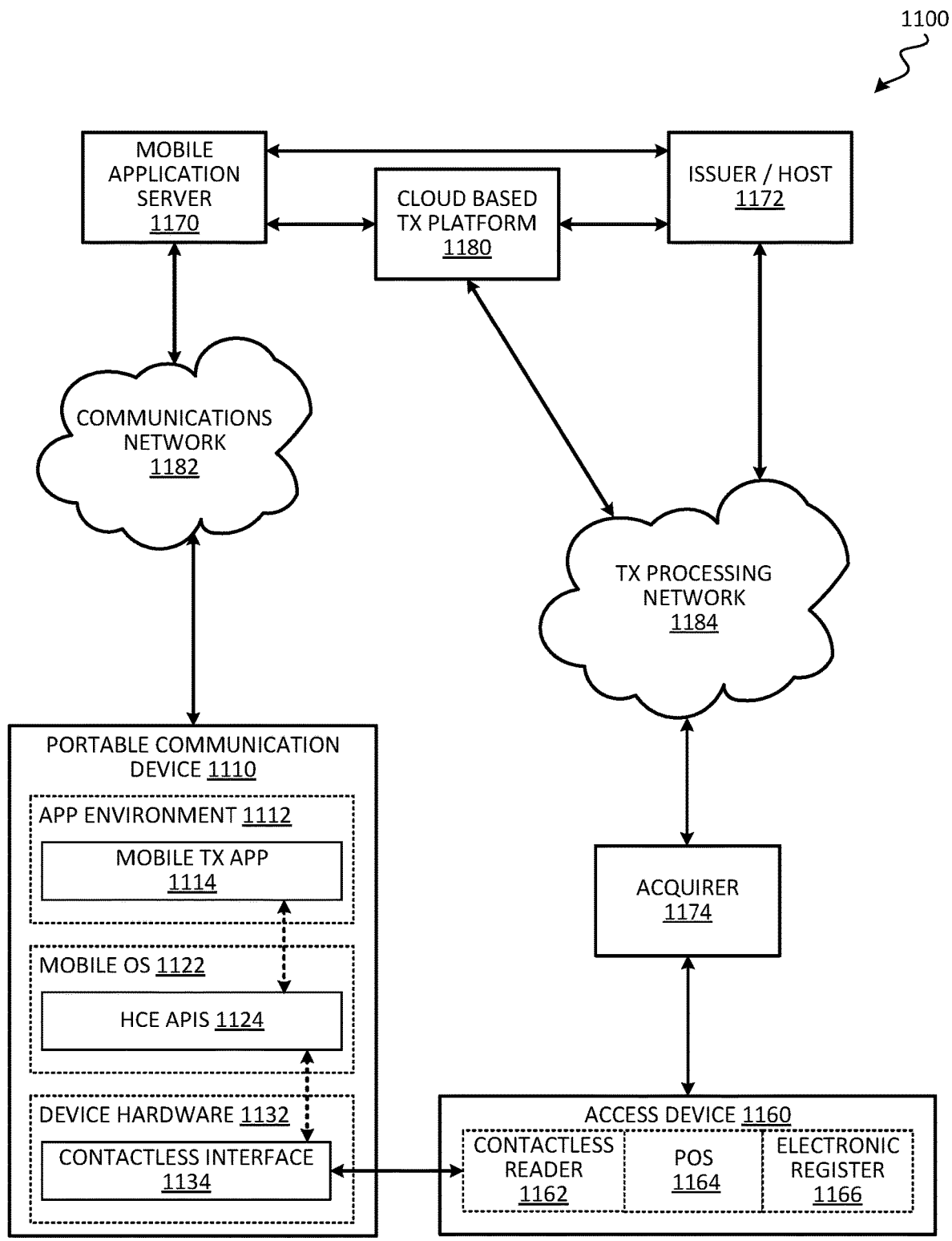
FIG. 11 illustrates a block diagram of an exemplary system in which an access credential having a timestamp can be used, according to some embodiments.

FIG. 11 illustrates a block diagram of an exemplary system 1100 in which the reliable timestamp techniques described herein can be used, according to some embodiments. System 1100 can be, for example, a cloud-based transaction system for conducting cloud-based transactions. It should be understood that the reliable timestamp techniques described herein can be applied to other types of systems which may or may not relate to transaction processing.

System 1100 can include a portable communication device 1110, a cloud-based transaction platform (CBP) 1180, and a mobile application platform (MAP) 1170. CBP 1180 may be implemented using one or more computing devices, and can be associated with or operated by an issuer, transaction processor, and/or other suitable entities. CBP 1180 implements a set of functionalities including account management, and account parameters generation and replenishment to enable could-based transactions to be conducted via portable communication device 1110.

MAP 1170 is used to facilitate communications between CBP 1180 and mobile application 1114 (e.g., an access application) installed on portable communication device 1110. MAP 1170 may be implemented using one or more computing devices, and can be associated with or operated by the service provider of mobile application 1114, such as an issuer, a mobile wallet provider, a merchant, and/or other suitable entities. In some embodiments, MAP 1170 can be associated with or operated by the same or different entity as CBP 1180. MAP 1170 is used to intermediate requests between the mobile application 1114 and CBP 1180, and to ensure that requests and responses initiated by either party are fulfilled once connectivity to portable communication device 1110 is established, for example, via a communications network 1182 (e.g., Internet, mobile or cellular network, etc.). It should be understood that in some embodiments, one or more functionalities of CBP 1180, MAP 1170, and/or issuer or host processing system 1172, may be integrated into the same computing system or different computing systems. In some embodiments, any one or more of CBP 1180, MAP 1170, and/or issuer or host processing system 1172 can act as an authorization server.

Portable communication device 1110 (e.g., communication device 1000) can be used to conduct cloud-based transactions (e.g., payment transactions) facilitated by CBP 1180 and/or MAP 1170. Portable communication device 1110 includes device hardware 1132, mobile operating system (OS) 1122, and applications environment 1112. Device hardware 1132 may include a contactless interface 1134 that can contactlessly communicate or otherwise present information to another device such as a contactless reader 1162 of an access device 1160. Examples of contactless interface 1134 can include a near-field communications (NFC) interface that can send and receive communications using radio frequency, or other wireless communication protocols such as Bluetooth, Bluetooth Low Energy (BLE), Wi-Fi, etc. Examples of contactless interface 1134 may also include an optical interface such as a display to present information such as quick response (QR) codes, barcodes, etc.

Applications environment 1112 of portable communication device 1110 may include a mobile application 1114 such as an access application provided by a service provider (e.g., an issuer). For example, if the service provider of mobile application 1114 is an issuer, mobile application 1114 may be a mobile banking application or a mobile payment application. If the service provider is a mobile wallet provider such as a mobile network operator or third-party wallet provider that supports multiple issuers, mobile application 1114 may be a mobile wallet application. For merchants, mobile application 1114 may be a merchant's own transaction application from which consumers can conduct e-commerce or point of sale transactions, or a mobile wallet application supporting multiple merchants.

In some embodiments, mobile application 1114 may include on-device cloud-based transaction logic integrated into mobile application 1114 to support cloud-based transactions. The on-device cloud-based transaction logic performs functions to facilitate cloud-based transactions such as to take account parameters provided for use in transactions and deliver them to mobile operating system 1122 for transmission over contactless interface 1134. For example, the on-device cloud-based transaction logic may use a cryptogram key (e.g., a limited-use key) provisioned from CBP 1180 to generate a transaction cryptogram that is transmitted over contactless interface to access device 1160 to conduct a transaction. The transaction cryptogram can be sent over to the transaction processing network 1184 (e.g., acting as an authorization network) to obtain authorization for the transaction. The on-device cloud-based transaction logic also manages the initial service profile parameters that are provided after an account has been provisioned to ensure that requests for account parameter replenishment and other account parameter management activities are initiated.

To provision portable communication device 1110 for cloud-based transactions, CBP 1180 can configure account portfolios associated with issuers and to provide portable communication device 1110 with account parameters that are uses when conducting cloud-based transactions. The account portfolios established by CBP 1180 can include characteristics such as risk parameters (e.g., velocity controls) that manages the triggers of when account parameters on a provisioned device will need to be refreshed for accounts in each portfolio. To ensure consistent performance and usability, a set of minimum parameters configurable in a service profile can be implemented by CBP 1180. To ensure that cloud-based payment transactions are processed according to the rules specified in the service profile for an account portfolio, CBP 1180 performs various core functions during the lifetime of an account that has been enabled. These functions can include provisioning, active account management, transaction verification, transaction processing, lifecycle management and post-payment.

CBP 1180 may create a service profile for a portfolio before an account is provisioned as a cloud-based transaction account. Provisioning may include taking an enrolled account, create account information such as an alternate account identifier (e.g., alternate Primary Account Number (PAN)) or a token acting as an account identifier substitute that can be used instead of a real account identifier (e.g., a real PAN) to conduct transactions, and inheriting service profile has been established for the portfolio. Once an account is provisioned, the relevant service profile details are shared with both the transaction processing and the on-device cloud-based transaction logic to ensure that decision making can be done at transaction processing and during mobile application usage by the user.

After an account has been provisioned, active account management can be performed by CBP 1180. Active account management can be initiated either from transaction processing activity or from mobile application activity. Once the account has been provisioned, the active account management capability generates the initial set of account parameters to be deployed to portable communication device 1110. The account parameters may include account information generated during provisioning (e.g., alternate account identifier or token), as well as dynamic information to ensure the set of account parameters have only a limited use or limited lifespan once delivered to the device. Dynamic information may include a limited-use key or dynamic data depending on what type of transaction is being supported. For example, the dynamic information may include limited-use keys (LUK) to calculate cryptograms, as well as limited use dynamic data to support legacy dynamic card verification value or code based implementations.

During transaction processing, if the service profile parameters maintained by CBP 1180 for a particular account indicate that account parameters on portable communication device 1110 need to be replaced, the active account management capability of CBP 1180 may connect to portable communication device 1110 via MAP 1170 to replenish the account parameters. Likewise, if the on-device service profile parameters stored on portable communication device 1110 indicate that account parameter replenishment is needed or is close to be being needed (i.e., by monitoring account parameter thresholds), then mobile application 1114 can make a request to CBP 1180 for account parameter replenishment.

Once portable communication device 1110 has been provisioned to conduct cloud-based transactions, transactions can be conducted via portable communication device 1110 by interacting with a contactless reader 1162 of an access device 1160 (e.g., at a merchant location). Components of access device 1160 may include point-of-sale (POS) terminal 1164 and/or electronic cash register 1166. In some embodiments, access device 1160 can be a web server associated with a merchant, and portable communication device 1110 can communicate with access device 1160 via a computer network. Access device 1160 can be coupled to acquirer 1174 (e.g., via a merchant computer not shown). Acquirer 1174 may be connected to an issuer or host processing system 1172 via transaction processing network 1184. Transaction processing network 1184 may include one or more server computers. A server computer is typically a powerful computer or cluster of computers. For example, the server computer can be a large mainframe, a minicomputer cluster, or a group of servers functioning as a unit. In one example, the server computer may be a database server coupled to a web server. Transaction processing network 1184 may use any suitable wired or wireless network, including the Internet.

Transaction processing network 1184 may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Each of the entities (e.g., acquirer 1174, transaction processing network 1184, issuer or host processing system 1172) may include one or more computers to enable communications, or to perform one or more of the functions described herein.

To conduct a cloud-based transaction, a user of portable communication device 1110 may tap portable communication device 1110 against contactless reader 1162 (e.g., via NFC) of access device 1160, or display an image such as a QR code or barcode on a screen of portable communication device 1110 that can be scanned by contactless reader 1162 (e.g., an optical scanner or camera) of access device 1160. In some embodiments, portable communication device 1110 may provide access device 1160 with access credential such as an account identifier (e.g., an alternate account identifier, a token, etc.), and additional information such as limited-use account parameters or information derived from the limited-use account parameters. For example, the access credential information can be encoded in a QR code or barcode that is scanned by access device 1160; or the access credential information can be transmitted to access device 1160 via NFC. In some embodiments, the limited-use account parameters included in the access credential may include a transaction cryptogram and a timestamp.

Access device 1160 or a merchant computer coupled to access device 1160 may generate an authorization request message including the account identifier and additional information (e.g., limited-use account parameters, or information derived from the limited-use account parameters), and forward the authorization request message to acquirer 1174. In some embodiments, to provide compatibility with legacy protocol messages that may not have a specific field in the authorization request message designated for timestamp information, the timestamp information can be transmitted in an existing data field such as an unpredictable number data field. The authorization request message is then sent to transaction processing network 1184. Transaction processing network 1184 then forwards the authorization request message to the corresponding issuer or host processing system 1172 associated with an issuer of the account associated with portable communication device 1110.

After issuer or host processing system 1172 receives the authorization request message, the authorization request message may be parsed, and information in the authorization request message may be sent to CBP 1180 for verification. An authorization response message is then sent back to transaction processing network 1184 to indicate whether the current transaction is authorized (or not authorized).

Transaction processing network 1184 then forwards the authorization response message back to acquirer 1174. In some embodiments, transaction processing network 1184 may decline the transaction even if issuer or host processing system 1172 has authorized the transaction, for example depending on a value of a fraud risk score or depending if limited-use account parameters are verified by CBP 1180. Acquirer 1174 then sends the authorization response message to the merchant computer and/or access device 1160. The authorization response results may be displayed by access device 1160, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by transaction processing network 1184. A clearing process may refer to a process of exchanging financial details between an acquirer and an issuer to facilitate posting to a customer's payment account and reconciliation of the user's settlement position.

The various entities or components described herein may be associated with or operate one or more computer apparatuses to facilitate the functions described herein. Any of the entities or components, including any computer, computing system, server, or database, may use any suitable number of subsystems to facilitate the functions. Components of such subsystem can be interconnected via a system bus. Additional subsystems such as a printer, keyboard, fixed disk (or other memory comprising computer readable media), monitor, which is coupled to display adapter, and others can also be coupled to the system bus. Peripherals and input/output (I/O) devices, which couple to an I/O controller (which can be a processor or other suitable controller), can be connected to the computer system by any number of means known in the art, such as a serial port. For example, a serial port or an external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Any of the computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by a server computer, an authentication request that includes an access credential having a timestamp generated by a communication device, the authentication request being received subsequent to the communication device transitioning from an active state to an inactive state and then back to the active state;
   determining, by the server computer, whether the communication device had successfully executed a predetermined shutdown sequence by determining whether the access credential has reliable timestamp information;
   authenticating, by the server computer, the communication device when the access credential has reliable timestamp information by having a non-reset value in the timestamp indicating that the communication device had successfully executed the predetermined shutdown sequence, and that the access credential has not expired; and requesting, by the server computer, step-up authentication for the communication device when the access credential has unreliable timestamp information indicating that the communication device did not successfully execute the predetermined shutdown sequence.

2. The method of claim 1, wherein the access credential indicates that the access credential has unreliable timestamp information by having a reset value in the timestamp.

3. The method of claim 1, wherein the communication device stores an authorization network time provided from a network as an authorization network synchronization time, and stores a system synchronization elapsed time that is updated with a system time of a system timer of the communication device when the communication device synchronizes with the server computer.

4. The method of claim 3, wherein when the access credential is generated while the authorization network synchronization time stored on the communication device has a default value, the timestamp included in the access credential has a reset value.

5. The method of claim 3, wherein when the access credential is generated while the authorization network synchronization time stored on the communication device has a non-default value, the timestamp included in the access credential has a value being a sum of:
   the authorization network synchronization time; and
   a difference between a current system time of the system timer of the communication device when the access credential is generated and the system synchronization elapsed time.

6. The method of claim 3, wherein the predetermined shutdown sequence includes:
   storing a local device shutdown time on the communication device reflecting a device time indicated by a user configurable timer of the communication device when the communication device is transitioned from the active state to the inactive state; and
   storing an authorization network device shutdown time on the communication device reflecting a sum of:
      the authorization network synchronization time; and
      a difference between a current system time of the system timer when the communication device is transitioned from the active state to the inactive state and the system synchronization elapsed time; and
   setting a device shutdown indicator on the communication device to an asserted state.

7. The method of claim 6, wherein if the device shutdown indicator is in the asserted state when the communication device is transitioned from the inactive state back to the active state, the authorization network synchronization time on the communication device is set to a sum of:
   the authorization network device shutdown time; and
   a difference between a current device time indicated by the user configurable timer when the communication device is transitioned from the active state to the inactive state and the local device shutdown time.

8. The method of claim 6, wherein if the device shutdown indicator is not in the asserted state when the communication device is transitioned from the inactive state back to the active state, the authorization network synchronization time on the communication device is set to a default value.

9. The method of claim 1, wherein the access credential is encoded in a QR code or a bar code.

10. The method of claim 1, wherein the access credential includes a cryptogram generated from a limited-use key.

11. A server computer comprising:
   a processor; and
   a memory storing computer readable code, which when executed by the processor, causes the server computer to perform operations including:
      receiving an authentication request that includes an access credential having a timestamp generated by a communication device, the authentication request being received subsequent to the communication device transitioning from an active state to an inactive state and then back to the active state;
      determining whether the communication device had successfully executed a predetermined shutdown sequence by determining whether the access credential has reliable timestamp information;
      authenticating the communication device when the access credential has reliable timestamp information by having a non-reset value in the timestamp indicating that the communication device had successfully executed the predetermined shutdown sequence, and that the access credential has not expired; and
      requesting step-up authentication for the communication device when the access credential has unreliable timestamp information indicating that the communication device did not successfully execute the predetermined shutdown sequence.

12. The server computer of claim 11, wherein the access credential indicates that the access credential has unreliable timestamp information by having a reset value in the timestamp.

13. The server computer of claim 11, wherein the communication device stores an authorization network time provided by a network as an authorization network synchronization time, and stores a system synchronization elapsed time that is updated with a system time of a system timer of the communication device when the communication device synchronizes with the server computer.

14. The server computer of claim 13, wherein the timestamp included in the access credential has a reset value when the access credential is generated while the authorization network synchronization time stored on the communication device has a default value.

15. The server computer of claim 13, wherein when the access credential is generated while the authorization network synchronization time stored on the communication device has a non-default value, the timestamp included in the access credential has a value being a sum of:
   the authorization network synchronization time; and
   a difference between a current system time of the system timer of the communication device when the access credential is generated and the system synchronization elapsed time.

16. The server computer of claim 13, wherein the predetermined shutdown sequence includes:
   storing a local device shutdown time on the communication device reflecting a device time indicated by a user configurable timer of the communication device when the communication device is transitioned from the active state to the inactive state; and
   storing an authorization network device shutdown time on the communication device reflecting a sum of:
      the authorization network synchronization time; and
      a difference between a current system time of the system timer when the communication device is transitioned from the active state to the inactive state and the system synchronization elapsed time; and
   setting a device shutdown indicator on the communication device to an asserted state.

17. The server computer of claim 16, wherein if the device shutdown indicator is in the asserted state when the communication device is transitioned from the inactive state back to the active state, the authorization network synchronization time on the communication device is set to a sum of:
   the authorization network device shutdown time; and
   a difference between a current device time indicated by the user configurable timer when the communication device is transitioned from the active state to the inactive state and the local device shutdown time.

18. The server computer of claim 16, wherein if the device shutdown indicator is not in the asserted state when the communication device is transitioned from the inactive state back to the active state, the authorization network synchronization time on the communication device is set to a default value.

19. The server computer of claim 11, wherein the access credential is encoded in a QR code or a bar code.

20. The server computer of claim 11, wherein the access credential includes a cryptogram generated from a limited-use key.

* * * * *